(12) United States Patent
Zhao et al.

(10) Patent No.: US 12,479,161 B2
(45) Date of Patent: Nov. 25, 2025

(54) THREE-DIMENSIONAL PRINTER APPARATUS WITH INTEGRATED LUBRICANT REPLENISHMENT SYSTEM

(71) Applicants: NISSAN NORTH AMERICA, INC., Franklin, TN (US); NORTHWESTERN UNIVERSITY, Evanston, IL (US)

(72) Inventors: Nanzhu Zhao, Novi, MI (US); Evan Jones, Evanston, IL (US); Sandeep Patil, Farmington Hills, MI (US); Cheng Sun, Wilmette, IL (US)

(73) Assignees: NISSAN NORTH AMERICA, INC., Franklin, TN (US); NORTHWESTERN UNIVERSITY, Evanston, IL (US)

( * ) Notice: Subject to any disclaimer, the term of this patent is extended or adjusted under 35 U.S.C. 154(b) by 166 days.

(21) Appl. No.: 18/326,971

(22) Filed: May 31, 2023

(65) Prior Publication Data

US 2024/0399664 A1 Dec. 5, 2024

(51) Int. Cl.
*B29C 64/00* (2017.01)
*B29C 64/129* (2017.01)
*B29C 64/245* (2017.01)
*B29C 64/307* (2017.01)
*B33Y 30/00* (2015.01)
*B33Y 40/00* (2020.01)

(52) U.S. Cl.
CPC .......... *B29C 64/307* (2017.08); *B29C 64/129* (2017.08); *B29C 64/245* (2017.08); *B33Y 30/00* (2014.12); *B33Y 40/00* (2014.12)

(58) Field of Classification Search
CPC ............................ B29C 64/307; B29C 64/245
See application file for complete search history.

(56) References Cited

U.S. PATENT DOCUMENTS

| | | | |
|---|---|---|---|
| 2015/0360419 A1* | 12/2015 | Willis | B29C 64/255 |
| | | | 425/174.4 |
| 2021/0094231 A1* | 4/2021 | Feller | B29C 64/393 |
| 2022/0001612 A1* | 1/2022 | Zhao | B33Y 30/00 |
| 2022/0063194 A1 | 3/2022 | Abdul Jabbar et al. | |
| 2023/0067468 A1 | 3/2023 | Sun et al. | |
| 2023/0158736 A1 | 5/2023 | Zhao et al. | |
| 2023/0158741 A1 | 5/2023 | Zhao et al. | |
| 2023/0158744 A1 | 5/2023 | Zhao et al. | |

\* cited by examiner

*Primary Examiner* — Nicholas R Krasnow
(74) *Attorney, Agent, or Firm* — Global IP Counselors, LLP (57) ABSTRACT

A three-dimensional printing system is provided that includes a tank, a textured substrate connected to the tank, and a reservoir. The tank contains a liquid photopolymer resin. The textured substrate is configured to allow light to pass through into the liquid photopolymer resin. The reservoir contains lubricant and is formed around a perimeter of the tank. The reservoir is connected to the textured substrate and configured to supply the lubricant to the textured substrate.

20 Claims, 6 Drawing Sheets

THREE-DIMENSIONAL PRINTER APPARATUS WITH INTEGRATED LUBRICANT REPLENISHMENT SYSTEM

BACKGROUND

Field of the Invention

The present invention generally relates to a three-dimensional printing system with an integrated lubricant replenishment system. The three-dimensional printing system includes a tank, a textured substrate connected to the tank, and a reservoir. The tank contains a liquid photopolymer resin. The textured substrate is configured to allow light to pass through into the liquid photopolymer resin. The reservoir contains lubricant and is formed around a perimeter of the tank. The reservoir is connected to the textured substrate and configured to supply the lubricant to the textured substrate. The present invention also relates to a three-dimensional printing system as described above in which the textured substrate further includes a plurality of internal channels.

Background Information

Three-dimensional ("3D") printers have been used to print a wide variety of three-dimensional products. Objects are printed layer by layer by the 3D printer by curing portions of a light curable photopolymer resin layer by layer, one layer at a time, within a printing area of a tank filled with the photopolymer resin. A curing device, such as an ultraviolet light source, is projected through a transparent substrate or bottom wall of the tank curing each layer of the object on a carrier surface that is at least partially submerged within the photopolymer. The carrier surface is incrementally raised upward as each layer is cured thereon. One problem with such conventional arrangement is that portions of the photopolymer resin can adhere to the transparent substrate (bottom wall of the tank). This adhesion slows and/or delays the printing process, thereby decreasing productivity. It is therefore advantageous to prevent adhesion of the photopolymer to the transparent substrate.

In order to address this problem of adhesion, textured windows have been developed that include a textured surface in contact with the photopolymer resin. The textured surface includes grooves that are configured to hold lubricant. The textured windows are substantially transparent and can be used as the transparent substrate. By providing a layer of the lubricant between the photopolymer resin and the transparent substrate, adhesion between the photopolymer and transparent substrate can be reduced.

Although these lubricant-infused textured windows can improve the printing speed by increasing the slip length along the textured window in the print area, the amount of lubricant along the surface of the textured window is depleted over time. Therefore, adhesion between the photopolymer and the transparent substrate can still become a problem when the amount of lubricant lost reaches a certain level. For example, a 20% loss in lubricant can render the textured window useless for printing due to adhesion problems. In addition, adhesion of the photopolymer to the transparent substrate can damage the textured window.

Therefore, further improvement is needed to reduce the adhesion of the photopolymer to the transparent substrate. In particular, it is desirable to compensate for the loss of lubricant on the surface of the textured window over time and to thereby extend the time which the 3D printer can continuously print.

SUMMARY

It has been discovered that the lubricant lost over time can be compensated for by providing an integrated lubricant replenishment system in which lubricant is replenished by a reservoir formed around the perimeter of the printing tank. The system includes a textured substrate connected to a tank and a reservoir that contains lubricant and is formed around a perimeter of the tank. The reservoir is configured to supply the lubricant to the textured substrate. By providing such a reservoir around the perimeter of the tank, lubricant lost over time can be replenished while maintaining a simple system design. In particular, by replenishing the lubricant via the reservoir, the system lifetime can be extended and the manufacturing yield improved by minimizing interruptions to the continuous 3D printing process. Furthermore, a simple system design can be maintained while preventing adhesion of the photopolymer to the transparent substrate even after a long period of operating time for the 3D printer.

Therefore, it is desirable to provide a three-dimensional printing system that includes such an integrated lubricant replenishment system with a textured surface at the bottom of the tank and a reservoir formed around the perimeter of the tank. It is also desirable to provide internal channels in the textured substrate for allowing the lubricant to flow through the textured window to the textured surface.

In view of the state of the known technology, one aspect of the present disclosure is to provide a three-dimensional printing system. The three-dimensional printing system includes a tank containing a liquid photopolymer resin, a textured substrate connected to the tank, and a reservoir containing lubricant. The textured substrate is configured to allow light to pass through into the liquid photopolymer resin. The reservoir is formed around a perimeter of the tank. The reservoir is also connected to the textured substrate and configured to supply the lubricant to the textured substrate. By providing the reservoir around the perimeter of the tank, lubricant lost during operation of the three-dimensional printing system can be replenished while maintaining a simple system design, thereby preventing adhesion of the liquid photopolymer resin to the textured substrate and allowing for longer and higher-speed continuous printing as compared with conventional three-dimensional printers.

Another aspect of the present disclosure is to provide a three-dimensional printing system as described above and further including a plurality of internal channels in the textured substrate. By further providing the plurality of internal channels in the textured substrate, lubricant can be passively replenished to further improve the continuous printing time and prevent adhesion of the liquid photopolymer resin to the textured substrate.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
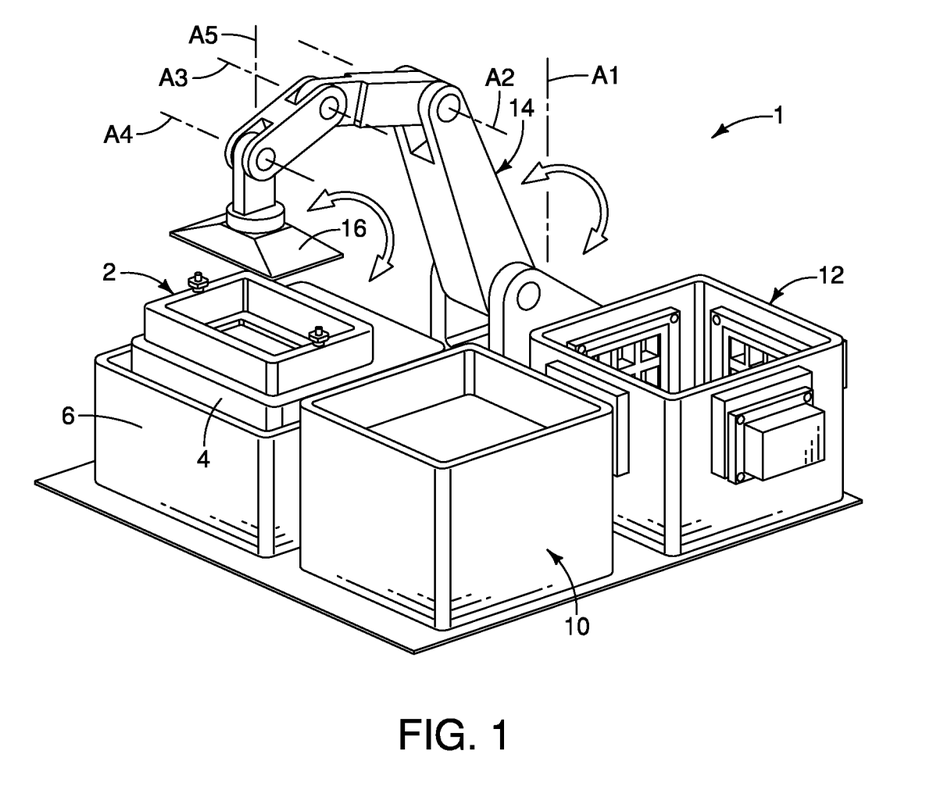
FIG. 1 is a perspective view of a 3D printer apparatus including a printer assembly having a textured window according to a first embodiment.

Referring initially to FIG. 1, a three-dimensional printer apparatus 1 (hereinafter the 3D printer apparatus 1) is illustrated in accordance with a first embodiment. The 3D printer apparatus 1 includes a printer assembly 2 having a tank 4 and a reservoir 6 surrounding the tank 4. The printer apparatus 1 also includes a rinse station 10, a final curing station 12, a robotic arm 14 and an object carrier 16 connected to the robotic arm 14.

As shown in FIG. 1, the printer assembly 2, the rinse station 10, the final curing station 12, the robotic arm 14 and the object carrier 16 are shown as an assembled group of devices. Alternatively, the 3D printer apparatus 1 can be separate stations that are individual units where the robotic arm 14, or a series of robotic arms are operated together in order to access and utilize the features of each of separated versions of the printer assembly 2, the rinse station 10 and the final curing station 12. It should be understood that the 3D printer apparatus 1 can include any suitable devices in addition to the printer assembly 1. For example, the 3D printer apparatus 1 can include only the printer assembly 2 and the robotic arm 14.

The printer assembly 2, the rinse station 10, the final curing station 12, the robotic arm 14 and the object carrier 16 can each be formed of any suitable material, such as a plastic material, a polymer materials and/or a metallic material.

Figure 2A:
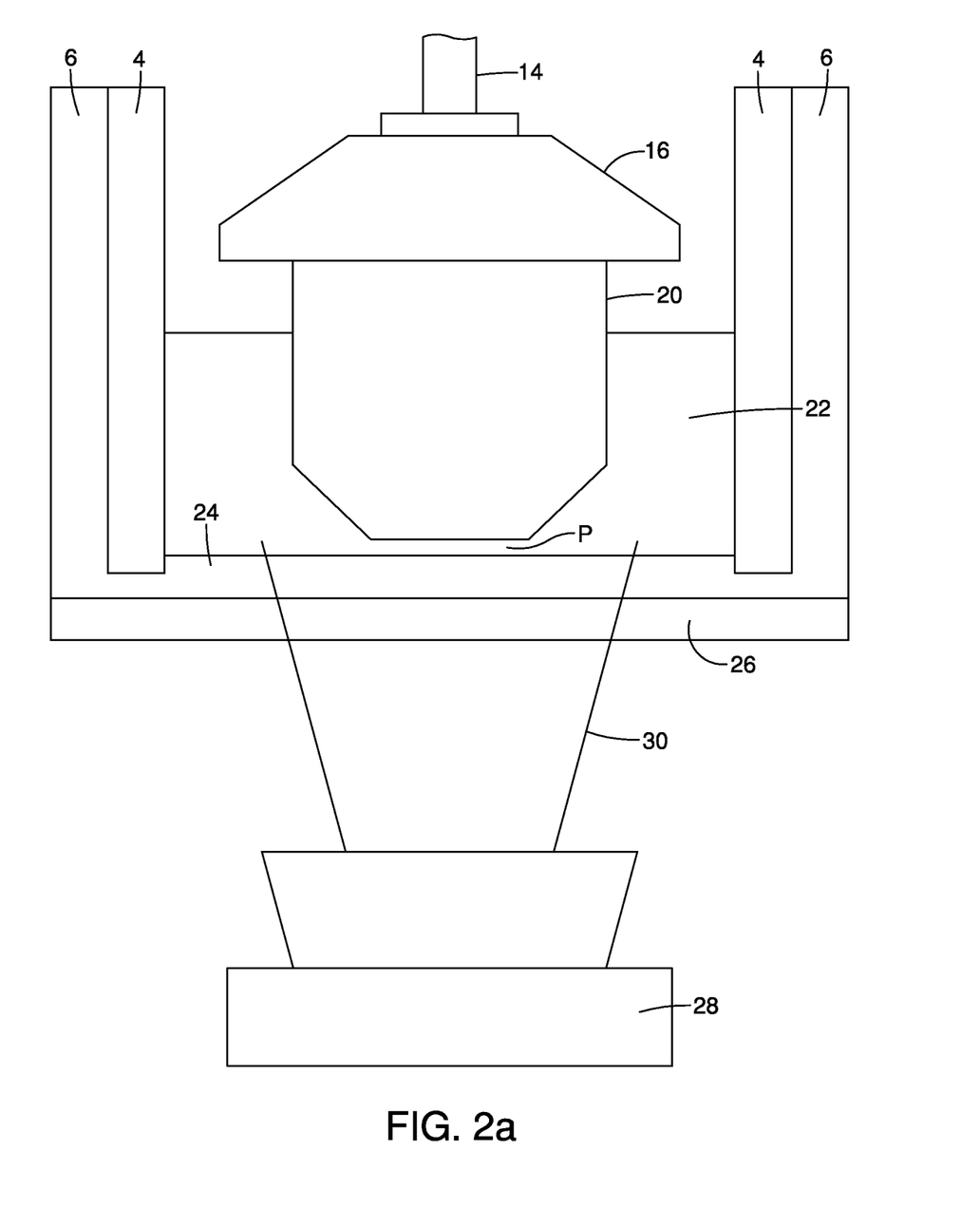
FIG. 2(a) is a side view of the printer assembly having the textured window according to the first embodiment.

As shown schematically in FIG. 2(a), the printer assembly 2 includes the tank 4, the reservoir 6 surrounding the tank 4, and the object carrier 16 connected to the robotic arm 14. The object carrier 16 is configured to carry an object 20 that is printed by the printer assembly 2. The printer assembly 2 also includes a resin curing device 28 that emits ultraviolet light 30. A more detailed description of each of these portions of the printer assembly 2 is provided after a brief overview of the basic functions of these features.

As is also shown in FIG. 2(a), during operation of the printer assembly 2, the tank 4 is at least partially filled with two differing liquid layers-top liquid layer 22 and bottom liquid layer 24. The top liquid layer 22 is a polymerizable resin that covers the bottom liquid layer 24. The top liquid layer 22 can be any suitable polymerizable resin, for example a photopolymer resin that is polymerized by the ultraviolet light 30. The top liquid layer 22 is preferably a photopolymer resin. In particular, the top liquid layer 22 can be formed of: a nylon having a photoinitiator wavelength of 290-315 nm, an acrylic having a photoinitiator wavelength of 290-315 nm, a styrene acrylonitrile having a photoinitiator wavelength of 290-330 nm, a polycarbonate having a photoinitiator wavelength of 280-310 nm, a polystyrene having a photoinitiator wavelength of 310-325 nm, a polyethylene having a photoinitiator wavelength of 300-340 nm, a polypropylene having a photoinitiator wavelength of 290-370 nm, an acrylonitrile butadiene styrene ("ABS") photopolymer having a photoinitiator wavelength of 300-385 nm, a polyvinyl chloride ("PVC") homopolymer having a photoinitiator wavelength of approximately 320 nm, a PVC copolymer having a photoinitiator wavelength of 330-370 nm, a polyurethane (aromatic) having a photoinitiator wavelength of 350-415 nm, or a mixture thereof.

The top layer 22 flows freely into the printing area P during the operation of the printing assembly 2, as is described in greater detail below. The polymerizable resin that forms the top layer 22 can be supplied to the tank 4 such that the polymerizable resin fills most or all of the interior volume of the tank 4, depending upon the object 20 being printed and the anticipated volume of use of polymerizable resin needed to print the object 20 being printed by the printer assembly 2.

The bottom liquid layer 24 is a lubricant that covers a textured window 26 and forms a liquid layer between the textured window 26 and the top liquid layer 22. One of the purposes of the bottom liquid layer 24 is to separate and space apart the polymerizable resin in the top liquid layer 22 from the textured window 26 of the tank 4. The bottom liquid layer 24 can be formed of any suitable lubricant, such as an oil having a low viscosity and low adhesion. For example, the bottom liquid layer 24 can be formed of a fluorinated oil. The fluorinated oil is preferably a perfluoropolyether ("PFPE") copolymer, a fluorosilicone polymer, a perfluorocarbon liquid, allicin oil, garlic oil, a synthetic PFPE-based oil that contains polytetrafluoroethylene ("PTFE") powder such as Krytox® GPL oil, Fomblin® Y PFPE oil, or a mixture thereof. The bottom layer 24 has a thickness of approximately 3 nm to 5 mm from the top surface of the textured window 26 facing the top liquid layer 22 to the bottom surface of the top liquid layer 22 facing the textured window 26.

As shown in FIG. 2(a), the reservoir 6 surrounds the tank 4 and is connected to a bottom of the tank 4 such that lubricant from the reservoir 6 can be supplied to the tank 4. Therefore, the reservoir 6 is formed integrally with the printer assembly 2 and the tank 4. However, it should be understood that the reservoir 6 can be provided as a separate piece from the tank 4. Preferably, the reservoir 6 is formed integrally with the tank 4 to provide a simplified system design.

The textured window 26 is a structure formed at the bottom of the tank 4 as shown in FIG. 2(a). The textured window 26 can be connected to the bottom of the tank 4 in any suitable manner or can be formed integrally with the bottom of the tank 4. For example, the textured window 26 can be attached to bottom ends or bottom edge sections of each side wall of the tank 4 to form a liquid tight space within the tank 4. The tank 4 can be manufactured of any suitable material, such as a plastic, a polymer, a metallic material, or any mixture thereof. By providing the textured window 26 below the bottom liquid layer 24, the lubricant from reservoir 6 can be supplied to the top surface of the textured window 26 facing the top liquid layer 22. The textured window 26 has a total thickness of approximately 10 μm to 5 cm. The textured window 26 is optically transparent and has an ultraviolet light transmittance of at least 60%, preferably at least 90%, such that focused beams of light from the resin curing device 28 pass therethrough and at predetermined areas or portions of the polymerizable resin located within the printing area P.

The resin curing device 28 is installed or located below the tank 4 and is positioned to selectively project light upward through transparent textured window 26 of the tank 4. An electronic controller (not shown) controls operation of the resin curing device 28 to cure and harden the polymerizable resin in the top liquid layer 22 located within the printing area P in order to form the object 20. As the resin in the top liquid layer 22 is cured, it forms a cured layer 38 between the object 20 being printed and the bottom liquid layer 24. The resin curing device 28 can be any of a variety of resin curing light sources such as an ultra-violet projector, laser (stereolithography) digital light projector, liquid crystal display, projector or other light emitting device capable of electronic focusing and imaging focused light in order to selectively cure polymerizable resin to form the object 20.

The printing area P is defined as being the space below the object carrier 16 (at and/or below a lower surface of the object 20 being printed) and the upper surface of the bottom liquid layer 24. Further, the printing area P is preferably located above and spaced apart from the textured window 26 of the tank 4 but can be in contact with the textured window 26 if the bottom liquid layer 24 is depleted during operation.

Figure 2B:
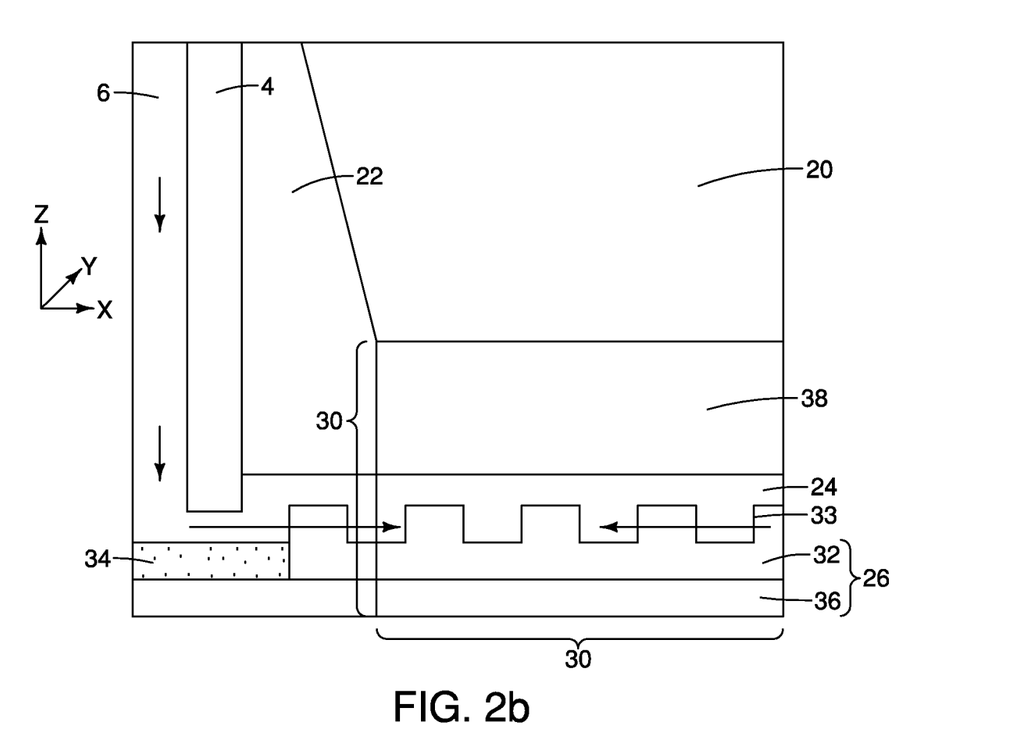
FIG. 2(b) is a partial enlarged cross sectional view of the printer assembly having the textured window of FIG. 2(a)

As shown in FIG. 2(b), the textured window 26 includes a first substrate 32, a second substrate 34 and a third substrate 36. The first substrate 32 and the second substrate 34 are provided on a top surface of the third substrate 36. The first substrate 32 is formed of any suitable optically transparent and soft polymer material. For example, the first substrate 32 can be made of an optically transparent silicone polymer such as polydimethylsiloxane ("PDMS"), an optically transparent fluorinated polymer, or a mixture thereof. Preferably, the first substrate 32 is made of PDMS. The first substrate 32 is made of a solid material and has a porosity of less than 20%. However, it should be understood that the first substrate 32 can alternatively have a porosity of greater than 30%. The first substrate 32 has a thickness of approximately 5 nm to 200 μm.

Figure 2C:
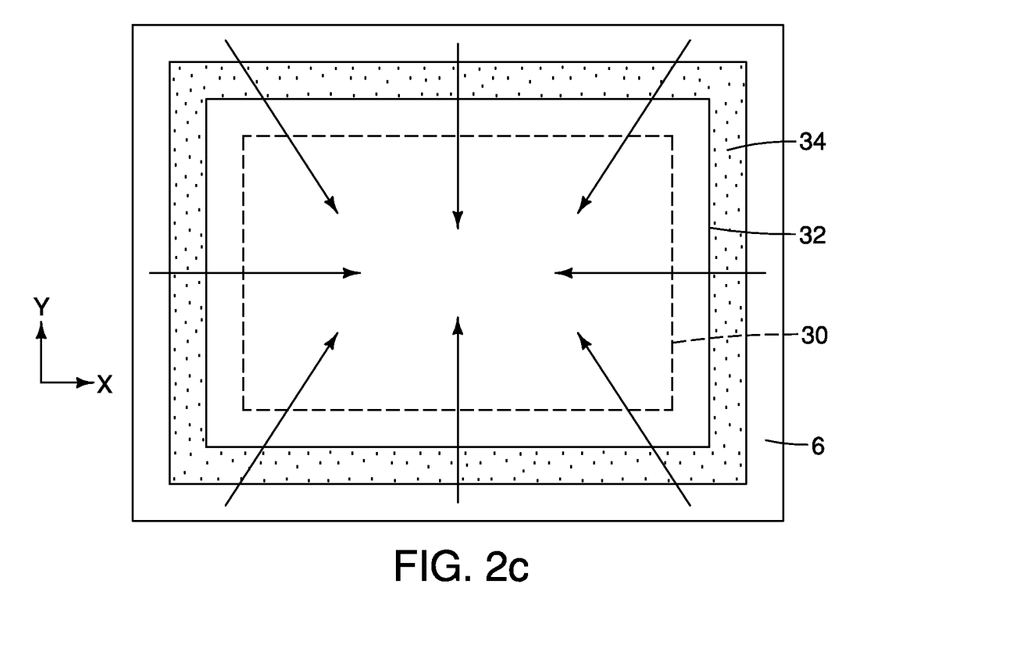
FIG. 2(c) is a top view of the printer assembly of FIG. 2(a)

As shown in FIGS. 2(b) and 2(c), the second substrate 34 is formed around a perimeter of the first substrate 32. In this embodiment, the second substrate 34 is in direct contact with the first substrate 32. However, it should be understood that the second substrate 34 can be formed around the first substrate 32 in any suitable manner and can be spaced apart from the first substrate 32.

Like the first substrate 32, the second substrate 34 is also made of a suitable optically transparent and soft polymer material. For example, the second substrate 34 can be made of an optically transparent silicone polymer such as PDMS, an optically transparent fluorinated polymer, or a mixture thereof. The second substrate 34 is preferably made of the same material as the first substrate 32. The second substrate 34 is also preferably made of PDMS. The second substrate 34 is formed of a porous material and preferably has a porosity of approximately 30% to 70%. The second substrate 34 has a thickness of approximately 5 nm to 200 μm.

The first substrate 32 and the second substrate 34 can be formed on the top surface of the third substrate 36 in any suitable manner. For example, the first substrate 32 and the second substrate 34 can each be adhered to the third substrate 36 by an adhesive material. Alternatively, the first substrate 32 and the second substrate 34 can be deposited on the third substrate 36 by any suitable deposition method, such as chemical vapor deposition ("CVD"), etching or additive and subtractive methods.

In this embodiment, the first substrate 32 is formed of a solid material having a porosity of less than 20% and the second substrate 34 is formed of a porous material having a porosity of 30% to 70%. However, it should be understood that the first substrate 32 and the second substrate 34 can both be porous and have a porosity of 30% to 70%. Alternatively, a single optically transparent substrate having a porosity of 30% to 70% can be used in place of the first substrate 32 and the second substrate 34.

The third substrate 36 is formed of any suitable optically transparent material. For example, the third substrate 36 can be made of plexiglass, traditional glass, any suitable transparent plastic or polymer material, or a mixture thereof. Preferably, the third substrate 36 is made of a glass material. The third substrate 36 has a thickness of approximately 9 μm to 3 cm.

Figure 3:
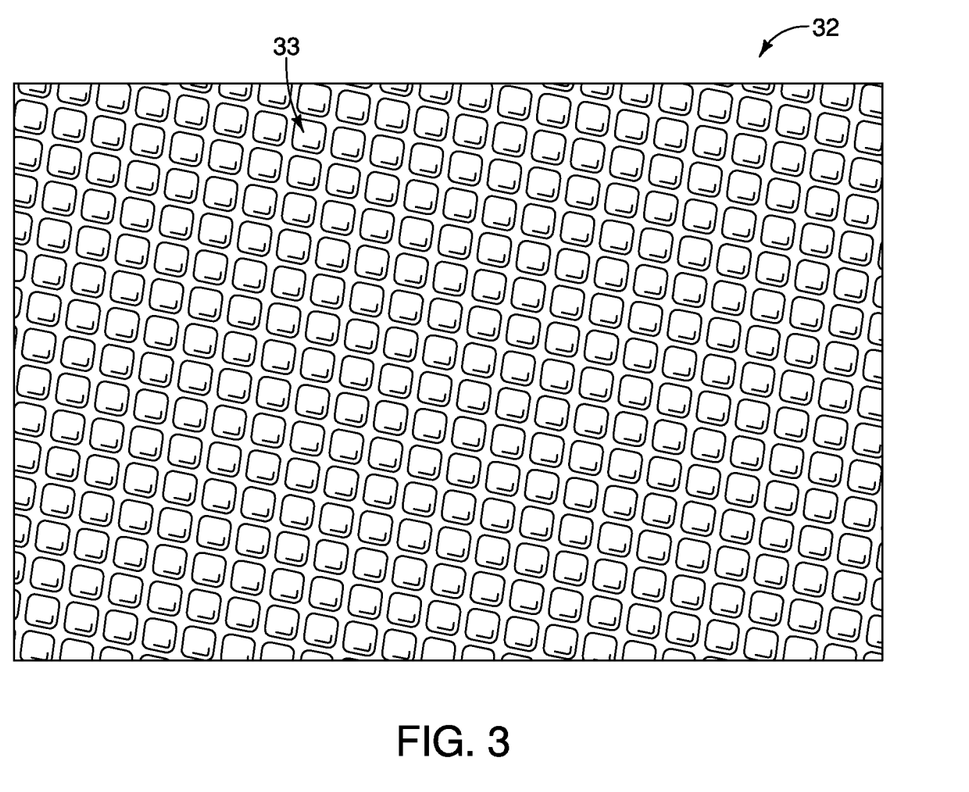
FIG. 3 is a partial enlarged top perspective view of the textured window of FIG. 2(a)

As shown in FIG. 2(b), the first substrate 32 includes a plurality of grooves 33 on the top surface of the first substrate 32 facing the bottom liquid layer 24. The grooves 33 form a textured surface on the top of the first substrate 32 facing the bottom liquid layer 24. The grooves 33 are configured to hold liquid from the bottom liquid layer 24 and can have any suitable shape. For example, the grooves 33 have a pillar-like shape and are formed along the top surface of the first substrate 32. Preferably, the grooves 33 have a cubic shape as illustrated in FIG. 3 with a same length, width and depth from the top surface of the first substrate 32. The grooves 33 have a depth, length and width each ranging from approximately 0.1 μm to 100 μm.

As shown in FIGS. 2(b) and 2(c), lubricant from the reservoir 6 flows down the reservoir and into the bottom of the tank 4 where the bottom liquid layer 24 is provided. The lubricant then flows over the second substrate 34 and through the grooves 33 in the first substrate 32. The flow of the lubricant into the bottom of the tank 4 from the reservoir 6 can be controlled based on the hydrostatic pressure in the reservoir 6. In particular, a higher liquid level or a larger amount of lubricant in the reservoir 6 creates a larger hydrostatic pressure and a higher lubricant level under the cured layer 38. During operation of the printer assembly 2, the lubricant forming the bottom liquid layer 24 is depleted. The hydrostatic pressure in the reservoir 6 causes the lubricant to flow from the reservoir 6 into the bottom of the tank 4 to replenish the lubricant forming the bottom liquid layer 24 that is lost during operation of the printer assembly 2.

However, it should be understood that operation of the reservoir 6 to supply lubricant to the bottom liquid layer 24 can alternatively be controlled using an electronic controller, a sensor and an external reservoir. For example, at least one sensor can be provided within the printer assembly 2 that detects the liquid level of the bottom liquid layer 24 and/or the liquid level of the reservoir 6. An electronic controller can control the amount of lubricant in the reservoir 6 based on the liquid level detected by the sensor(s) and using lubricant from the external reservoir. For example, the electronic controller can increase the amount of lubricant in the reservoir 6 by pumping lubricant from the external reservoir to the integrally formed reservoir 6.

The grooves 33 in FIG. 3 are shown from the bottom surface of the first substrate 32. As shown in FIG. 3, the grooves 33 are formed in a pattern along the top surface of the first substrate 32. For example, as shown in FIG. 3, the grooves 33 in the top surface of the first substrate 32 can be formed as a pattern of cubic pillars projecting toward the bottom surface of the first substrate. However, it should be understood that the grooves 33 can have any suitable shape for holding the lubricant in the bottom liquid layer 24.

Figure 4A:
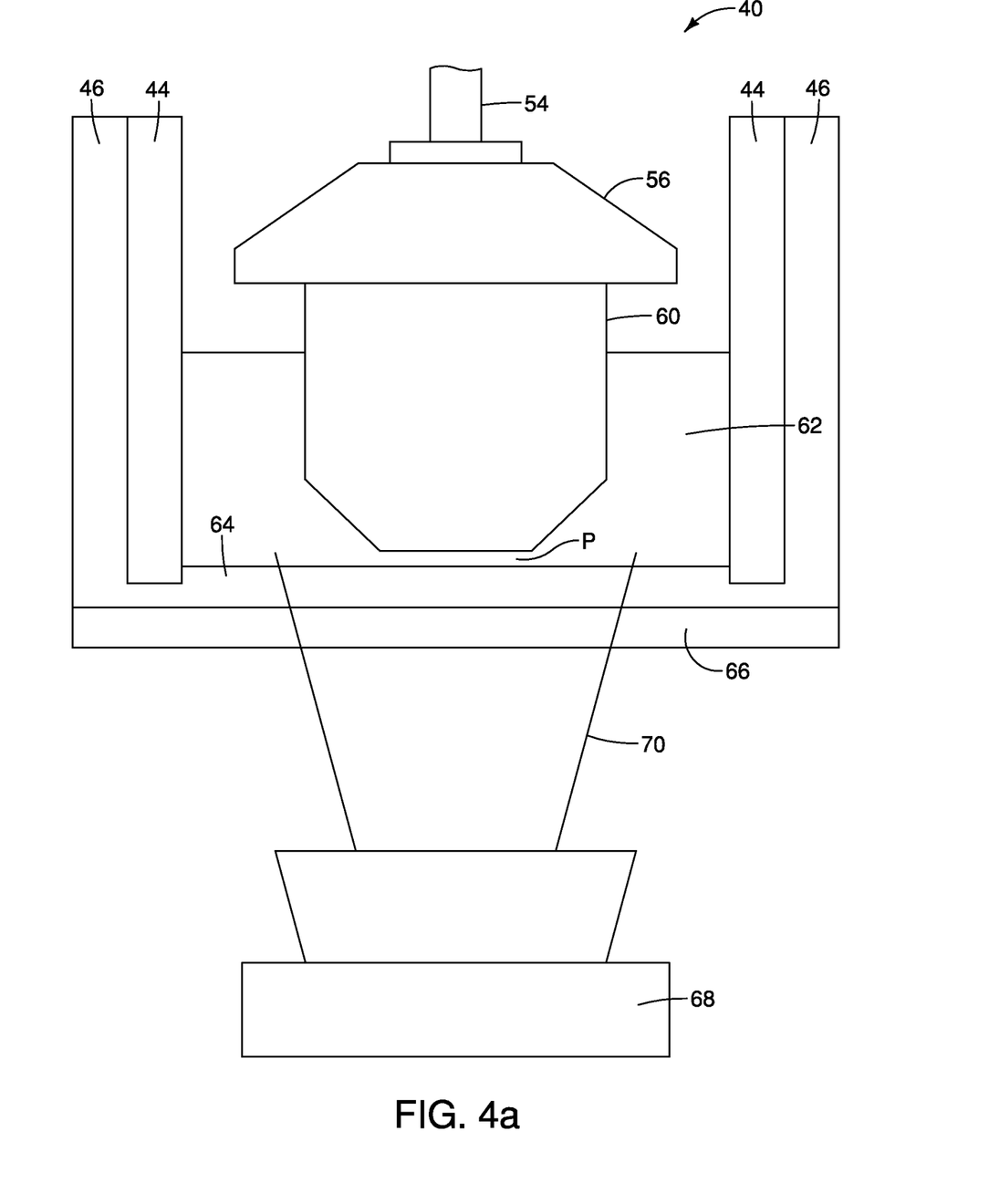
FIG. 4(a) is a side view of a printer assembly having a textured window according to a second embodiment.

FIG. 4(a) shows a printer assembly 40 in accordance with a second embodiment. As shown schematically in FIG. 4(a), the printer assembly 40 includes the tank 44, the reservoir 46 surrounding the tank 44, and an object carrier 56 connected to a robotic arm 54. The object carrier 56 is configured to carry an object 60 that is printed by the printer assembly 40. The printer assembly 40 also includes a resin curing device 68 that emits ultraviolet light 70. A more detailed description of each of these portions of the printer assembly 40 is provided after a brief overview of the basic functions of these features.

During operation of the printer assembly 40, the tank 44 is at least partially filled with two differing liquid layers— top liquid layer 62 and bottom liquid layer 64. The top liquid layer 62 is a polymerizable resin that covers the bottom liquid layer 64. The top liquid layer 62 can be any suitable polymerizable resin, for example a photopolymer resin that is polymerized by the ultraviolet light 70. The top liquid layer 62 is preferably a photopolymer resin. In particular, the top liquid layer 62 can be formed of: a nylon having a photoinitiator wavelength of 290-315 nm, an acrylic having a photoinitiator wavelength of 290-315 nm, a styrene acrylonitrile having a photoinitiator wavelength of 290-330 nm, a polycarbonate having a photoinitiator wavelength of 280-310 nm, a polystyrene having a photoinitiator wavelength of 310-325 nm, a polyethylene having a photoinitiator wavelength of 300-340 nm, a polypropylene having a photoinitiator wavelength of 290-370 nm, an ABS photopolymer having a photoinitiator wavelength of 300-385 nm, a PVC homopolymer having a photoinitiator wavelength of approximately 320 nm, a PVC copolymer having a photoinitiator wavelength of 330-370 nm, a polyurethane (aromatic) having a photoinitiator wavelength of 350-415 nm, or a mixture thereof.

The top layer 62 flows freely into the printing area P during the operation of the printing assembly 40, as is described in greater detail below. The polymerizable resin that forms the top layer 62 can be supplied to the tank 64 such that the polymerizable resin fills most or all of the interior volume of the tank 64, depending upon the object 60 being printed and the anticipated volume of use of polymerizable resin needed to print the object 60 being printed by the printer assembly 40.

The bottom liquid layer 64 is a lubricant that covers a textured window 66 and forms a liquid layer between the textured window 66 and the top liquid layer 62. One of the purposes of the bottom liquid layer 64 is to separate and space apart the polymerizable resin in the top liquid layer 62 from the textured window 66 of the tank 44. The bottom liquid layer 64 can be formed of any suitable lubricant, such as an oil having a low viscosity and low adhesion. For example, the bottom liquid layer 64 can be formed of a fluorinated oil. The fluorinated oil is preferably a PFPE copolymer, a fluorosilicone polymer, a perfluorocarbon liquid, allicin oil, garlic oil, a synthetic PFPE-based oil that contains PTFE powder such as Krytox® GPL oil, Fomblin® Y PFPE oil, or a mixture thereof. The bottom layer 64 has a thickness of approximately 3 nm to 5 mm from the top surface of the textured window 66 facing the top liquid layer 62 to the bottom surface of the top liquid layer 62 facing the textured window 66.

As shown in FIG. 4(a), the reservoir 46 surrounds the tank 44 and is connected to a bottom of the tank 44 such that lubricant from the reservoir 46 can be supplied to the tank 44. Therefore, the reservoir 46 is formed integrally with the printer assembly 40 and the tank 44. However, it should be understood that the reservoir 46 can be provided as a separate piece from the tank 44. Preferably, the reservoir 46 is formed integrally with the tank 64 to provide a simplified system design.

The textured window 66 is a structure formed at the bottom of the tank 44 as shown in FIG. 4(a). The textured window 66 can be connected to the bottom of the tank 44 in any suitable manner or can be formed integrally with the bottom of the tank 44. For example, the textured window 66 can be attached to bottom ends or bottom edge sections of each side wall of the tank 44 to form a liquid tight space within the tank 44. The tank 44 can be manufactured of any suitable material, such as a plastic, a polymer, a metallic material, or any mixture thereof. By providing the textured window 66 below the bottom liquid layer 44, the lubricant from reservoir 66 can be supplied to the top surface of the textured window 66 facing the top liquid layer 62. The textured window 66 has a total thickness of approximately 10 µm to 5 cm. The textured window 66 is optically transparent and has an ultraviolet light transmittance of at least 60%, preferably at least 90%, such that focused beams of light from the resin curing device 68 pass therethrough and at predetermined areas or portions of the polymerizable resin located within the printing area P.

The resin curing device 68 is installed or located below the tank 44 and is positioned to selectively project light upward through transparent textured window 66 of the tank 44. An electronic controller (not shown) controls operation of the resin curing device 68 to cure and harden the polymerizable resin in the top liquid layer 62 located within the printing area P in order to form the object 60. As the resin in the top liquid layer 62 is cured, it forms a cured layer 78 between the object 60 being printed and the bottom liquid layer 64. The resin curing device 68 can be any of a variety of resin curing light sources such as an ultra-violet projector, laser (stereolithography) digital light projector, liquid crystal display, projector or other light emitting device capable of electronic focusing and imaging focused light in order to selectively cure polymerizable resin to form the object 60.

The printing area P is defined as being the space below the object carrier 56 (at and/or below a lower surface of the object 60 being printed) and the upper surface of the bottom liquid layer 64. Further, the printing area P is located above and spaced apart from the textured window 66 of the tank 44.

Figure 4B:
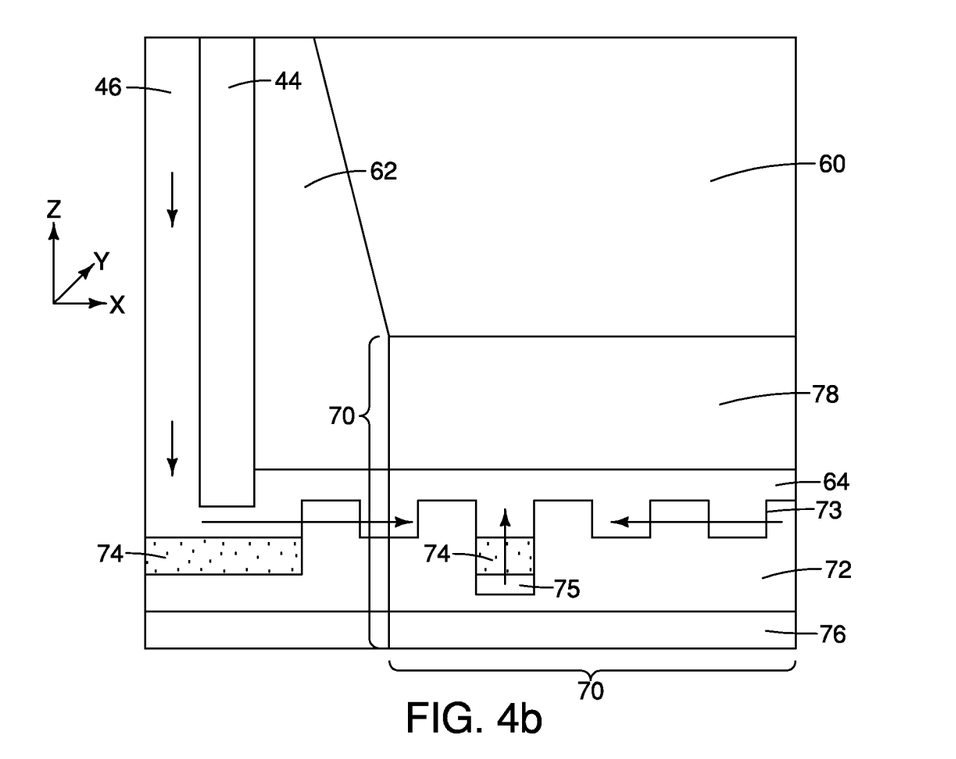
FIG. 4(b) is a partial enlarged cross sectional view of the printer assembly having the textured window of FIG. 4(a)

As shown in FIG. 4(b), the textured window 66 includes a first substrate 72, a second substrate 74 and a third substrate 76. The first substrate 72 is formed of any suitable optically transparent and soft polymer material. For example, the first substrate 72 can be made of an optically transparent silicone polymer such as PDMS, an optically transparent fluorinated polymer, or a mixture thereof. Preferably, the first substrate 32 is made of PDMS. The first substrate 72 is made of a solid material and has a porosity of less than 20%. However, it should be understood that the first substrate 72 can alternatively have a porosity of greater than 30%. The first substrate 72 has a thickness of approximately 5 nm to 200 µm.

As shown in FIG. 4(b), the first substrate 72 includes a plurality of grooves 73 on the top surface of the first substrate 72 facing the bottom liquid layer 64. The grooves 73 form a textured surface on the top of the first substrate 72 facing the bottom liquid layer 64. The grooves 73 are configured to hold liquid from the bottom liquid layer 64 and can have any suitable shape. For example, the grooves 73 have a pillar-like shape and are formed along the top surface of the first substrate 72. Preferably, the grooves 73 have a cubic shape with a same length, width and depth from the top surface of the first substrate 72. The grooves 73 have a depth, length and width each ranging from approximately 0.1 μm to 100 μm.

Figure 4C:
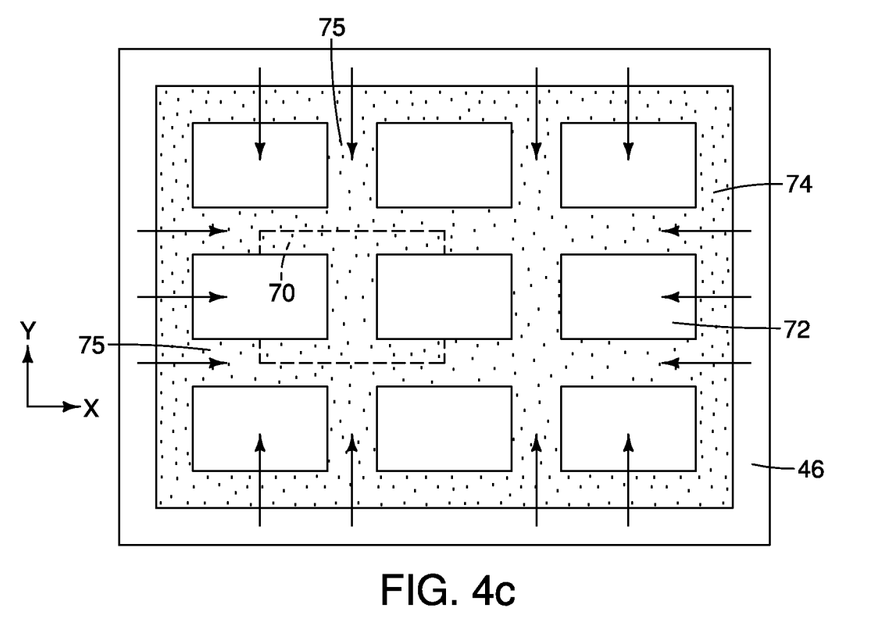
FIG. 4(c) is a top view of the printer assembly of FIG. 4(a).

As shown in FIGS. 4(b) and 4(c), the second substrate 74 is disposed on part of the surface of the first substrate 72 such that a portion of the second substrate 74 is provided on a top surface of the first substrate 72, and another portion of the second substrate 74 is provided between the grooves 73 of the first substrate 72. It should be understood that the second substrate 74 can be formed on the first substrate 72 in any suitable manner. For example, the second substrate 74 can be adhered to the first substrate 72 by an adhesive material. Alternatively, the second substrate 74 can be deposited on the first substrate 74 by any suitable deposition method, such as CVD, etching or additive and subtractive methods.

Like the first substrate 72, the second substrate 74 is made of a suitable optically transparent and soft polymer material. For example, the second substrate 74 can be made of an optically transparent silicone polymer such as PDMS, an optically transparent fluorinated polymer, or a mixture thereof. The second substrate 74 is preferably made of the same material as the first substrate 72. The second substrate 74 is also preferably made of PDMS. The second substrate 74 is formed of a porous material and preferably has a porosity of approximately 30% to 70%. The second substrate 74 has a thickness of approximately 5 nm to 200 μm.

The first substrate 72 also includes a plurality of internal channels 75 as shown in FIGS. 4(b) and 4(c). The internal channels 75 are formed below the second substrate 74 between the second substrate 74 and a surface of the first substrate 72. The internal channels 75 may be formed in any suitable manner. For example, the internal channels 75 may be formed by etching a groove below the second substrate 74 after it is deposited on the first substrate 72.

The internal channels 75 can be formed in any suitable pattern below the second substrate 74. For example, the internal channels 75 can be formed in a grid-like pattern below the second substrate 74 as shown in FIG. 4(c). The internal channels 75 each have a height of approximately 0.01 μm to 50 μm and a width of approximately 0.01 μm to 50 μm and extend along an entire length of the second substrate 74 in the x and y directions.

The first substrate 72 can be formed on the top surface of the third substrate 76 in any suitable manner. For example, the first substrate 72 can be adhered to the third substrate 76 by an adhesive material. Alternatively, the first substrate 72 can be deposited on the third substrate 76 by any suitable deposition method, such as CVD, etching or additive and subtractive methods.

In this embodiment, the first substrate 72 is formed of a solid material having a porosity of less than 20% and the second substrate 74 is formed of a porous material having a porosity of 30% to 70%. However, it should be understood that the first substrate 72 and the second substrate 74 can both be porous and have a porosity of 30% to 70%. Alternatively, a single optically transparent substrate having a porosity of 30% to 70% can be used in place of the first substrate 72 and the second substrate 74.

The third substrate 76 is formed of any suitable optically transparent material. For example, the third substrate 76 can be made of plexiglass, traditional glass, any suitable transparent plastic or polymer material, or a mixture thereof. Preferably, the third substrate 76 is made of a glass material. The third substrate 76 has a thickness of approximately 9 μm to 3 cm.

As shown in FIGS. 4(b) and 4(c), lubricant from the reservoir 46 flows down the reservoir and into the bottom of the tank 44 where the bottom liquid layer 64 is provided. The lubricant then flows over the second substrate 74 and through the grooves 73 in the first substrate 72. The flow of the lubricant into the bottom of the tank 44 from the reservoir 46 can be controlled based on the hydrostatic pressure in the reservoir 46. In particular, a higher liquid level or a larger amount of lubricant in the reservoir 46 creates a larger hydrostatic pressure and a higher lubricant level under the cured layer 78. During operation of the printer assembly 40, the lubricant forming the bottom liquid layer 64 is depleted. The hydrostatic pressure in the reservoir 46 causes the lubricant to flow from the reservoir 46 into the bottom of the tank 44 to replenish the lubricant forming the bottom liquid layer 64 that is lost during operation of the printer assembly 40.

However, it should be understood that operation of the reservoir 46 to supply lubricant to the bottom liquid layer 64 can alternatively be controlled using an electronic controller, a sensor and an external reservoir. For example, at least one sensor can be provided within the printer assembly 40 that detects the liquid level of the bottom liquid layer 64 and/or the liquid level of the reservoir 46. An electronic controller can control the amount of lubricant in the reservoir 46 based on the liquid level detected by the sensor(s) and using lubricant from the external reservoir. For example, the electronic controller can increase the amount of lubricant in the reservoir 46 by pumping lubricant from the external reservoir to the integrally formed reservoir 46.

By providing the textured window and a reservoir formed around a perimeter of the tank, lubricant lost during operation of the printer assembly can be replenished, thereby ensuring an increased slip length on the textured surface of the textured window and a faster printing time by preventing adhesion of the cured material to the textured window. Furthermore, by providing the textured window with porous portion(s), lubricant can be passively supplied to the textured surface of the textured window from the reservoir through the porous portion(s) of the textured window.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including." "having" and their derivatives. Also, the terms "part," "section," "portion," or "element" when used in the singular can have the dual meaning of a single part or a plurality of parts.

The terms of degree, such as "approximately" or "substantially" as used herein, mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A 3D printing system comprising:
a tank containing a liquid photopolymer resin;
a textured substrate connected to the tank, the textured substrate being configured to allow light to pass through into the liquid photopolymer resin; and
a reservoir containing lubricant,
the reservoir surrounding a perimeter of the tank, and
the reservoir connected to the textured substrate and configured to supply the lubricant to the textured substrate.

2. The 3D printing system according to claim 1, wherein:
the textured substrate comprises a first substrate that is optically transparent and a second substrate formed on a surface of the first substrate,
the second substrate includes a textured surface facing the liquid photopolymer resin, and
the reservoir is connected to the textured surface of the second substrate.

3. The 3D printing system according to claim 2, wherein the textured surface includes at least one groove formed in the second substrate.

4. The 3D printing system according to claim 3, wherein each of the at least one groove has a cubic shape.

5. The 3D printing system according to claim 2, wherein the first substrate is formed of a glass material.

6. The 3D printing system according to claim 2, wherein the second substrate is formed of at least one selected from the group consisting of: a silicone polymer and a fluorinated polymer.

7. The 3D printing system according to claim 6, wherein the second substrate is formed of polydimethylsiloxane.

8. The 3D printing system according to claim 2, wherein the second substrate includes at least a porous portion formed of a porous polymer material.

9. The 3D printing system according to claim 8, wherein the reservoir is in contact with at least the porous portion of the second substrate.

10. The 3D printing system according to claim 8, wherein the porous portion is disposed at a perimeter of the second substrate.

11. The 3D printing system according to claim 1, wherein:
the textured substrate is connected to a bottom of the tank, and
the reservoir is connected to the bottom of the tank such that the reservoir is configured to supply the lubricant to the textured substrate.

12. A 3D printing system comprising:
a tank containing a liquid photopolymer resin;
a textured substrate connected to the tank, the textured substrate being configured to allow light to pass through into the liquid photopolymer resin; and
a reservoir containing lubricant,
the reservoir surrounding a perimeter of the tank,
the reservoir connected to the textured substrate and configured to supply the lubricant to the textured substrate, and
the textured substrate including a plurality of internal channels.

13. The 3D printing system according to claim 12, wherein:
the textured substrate comprises a first substrate that is optically transparent and a second substrate formed on a surface of the first substrate,
the second substrate includes a textured surface facing the liquid photopolymer resin, and
the plurality of internal channels is formed in the second substrate.

14. The 3D printing system according to claim 13, wherein
the textured surface includes at least one groove formed in the second substrate.

15. The 3D printing system according to claim 14, wherein
each of the at least one groove has a cubic shape.

16. The 3D printing system according to claim 13, wherein
the first substrate is formed of a glass material.

17. The 3D printing system according to claim 13, wherein
the second substrate is formed of at least one selected from the group consisting of: a silicone polymer and a fluorinated polymer.

18. The 3D printing system according to claim 17, wherein
the second substrate is formed of polydimethylsiloxane.

19. The 3D printing system according to claim 13, wherein
the second substrate includes at least a porous portion formed of a porous polymer material.

20. The 3D printing system according to claim 19, wherein
the porous portion is disposed on a top surface of the second substrate such that at least a part of the porous portion is provided between each of the plurality of internal channels and the liquid photopolymer resin.

* * * * *